(12) United States Patent
Feng et al.

(10) Patent No.: US 7,642,010 B2
(45) Date of Patent: Jan. 5, 2010

(54) LIQUID LOW-SODIUM SILICATE ELECTROLYTE USED FOR A STORAGE BATTERY AND MANUFACTURED BY MAGENTIZATION PROCESS, AND THE USAGE THEREOF

(76) Inventors: Yuesheng Feng, Rm 502, No. 14, Qianjin Road, Guangzhou, Guangdong (CN) 510022; Dian Han, Rm 502, No. 14, Qianjin Road, Guangzhou, Guangdong (CN) 510022; Yifeng Feng, Rm 502, No. 14, Qianjin Road, Guangzhou, Guangdong (CN) 510022

( * ) Notice: Subject to any disclaimer, the term of this patent is extended or adjusted under 35 U.S.C. 154(b) by 246 days.

(21) Appl. No.: 11/876,684

(22) Filed: Oct. 22, 2007

(65) Prior Publication Data

US 2008/0044726 A1 Feb. 21, 2008

Related U.S. Application Data

(63) Continuation of application No. 10/480,282, filed as application No. PCT/CN01/01222 on Aug. 9, 2001, now Pat. No. 7,501,205.

(30) Foreign Application Priority Data

Jun. 12, 2001 (CN) ................. 01 1 29341

(51) Int. Cl.
*H01M 6/14* (2006.01)
*C09K 3/00* (2006.01)
*H01M 4/82* (2006.01)
*H01M 6/04* (2006.01)
*H01M 10/08* (2006.01)
*H01G 9/035* (2006.01)

(52) U.S. Cl. ............... 429/188; 29/623.1; 252/62.51 R; 252/62.2; 429/204

(58) Field of Classification Search ....................... None
See application file for complete search history.

(56) References Cited

U.S. PATENT DOCUMENTS 5,202,196 A 4/1993 Wang et al.
5,664,321 A * 9/1997 Sielemann et al. ......... 29/623.1

* cited by examiner

*Primary Examiner*—Robert Hodge
(74) *Attorney, Agent, or Firm*—Lowe Hauptman Ham & Berner

(57) ABSTRACT

A liquid low concentration sodium-containing silicate solution as electrolyte for lead-acid storage batteries and its applications, is prepared by mixing a silica gel containing 40~60 wt % $SiO_2$, the weight units of such a silica gel are 5~15; add 15-25 weight units water and stir until the concentration of the mixture is 0.65~0.85 °Be' measured by a Baum densimeter, adjusting the pH value of this mixture to 1-4 using inorganic acid and magnetizing the mixture under 1000-6000 Gauss magnetic field for 5-10 minutes, stir the magnetized mixture until the viscosity of the mixture is less than 0.02 poise and finally obtain a liquid low concentration sodium-containing silicate solution. The electrolyte can be used as electrolyte or activation solution for common or special lead-acid storage batteries.

5 Claims, 2 Drawing Sheets

LIQUID LOW-SODIUM SILICATE ELECTROLYTE USED FOR A STORAGE BATTERY AND MANUFACTURED BY MAGENTIZATION PROCESS, AND THE USAGE THEREOF

CROSS REFERENCE TO RELATED APPLICATIONS

The present application is based on and claims priority from P.R. China Patent Application No. 01129341.1 filed on Jun. 12, 2001; PCT International Application PCT/CN01/01222 filed on Aug. 9, 2001 claiming priority to the P.R. China Patent Application No. 01129341.1; and U.S. patent application Ser. No. 10/480,282, now U.S. Pat. No. 7,501,205, the disclosures of which are hereby incorporated by reference in their entirety.

FIELD OF THE INVENTION

Present invention relates to a silicate electrolyte for lead-acid storage batteries, especially related to a low concentration sodium-containing silicate solution as electrolyte/activation solution for lead-acid storage batteries, which is prepared by a magnetization technology, and the applications of this electrolyte/activation solution.

BACKGROUND OF THE INVENTION

Normally lead-acid storage batteries use concentrated sulfuric acid diluted by distilled water as electrolyte. During the production of lead-acid storage batteries, due to the difficulties of treating acidic electrolyte, serious environment pollution is unavoidable in assembling, application and disuse. In addition to the releasing of acidic smog during the utilization of conventional open-mouth type lead-acid storage batteries, it corrodes the junction parts of the batteries and is not safe for application and transportation.

Recently, a gel electrolyte has been developed in the form of a high-capacity gel electrolyte described in patent ZL90102355. This gel electrolyte contains silica gel and sulfuric acid, the main component of the silica gel is $SiO_2 \times H_2O$, wherein the weight ratio of sulfuric acid and $SiO_2$ is 4.5/10.5. Although the batteries using such gel electrolyte show high capacity and have advantages compared to the batteries using sulfuric acid electrolyte, this type gel electrolyte is still using a large amount of sulfuric acid, and it also has the disadvantages such as environment pollution, unsafe transportation and application.

In addition, the capacity of the batteries using gel-type electrolyte is 70% or even less of the capacity of the batteries using sulfuric acid electrolyte. Therefore, the specific energy density is relative low and internal resistance is high. It also looses water more easily then becomes increasingly harder, which decrease the performance and cycle life of the batteries.

Before this invention, the inventor has previously proposed a complex silicate electrolyte without sodium (PCT/CN99/00116). This silicate electrolyte is composed of an organic silicane and sulfuric acid at certain weight ratio. It overcomes the main disadvantages of sulfuric acid electrolyte. However, it was found that due to using sodium silicate as gel, the filling of gel into the batteries is difficult. Sometimes the filling of the electrolyte needs to be repeated several times. Thus, the filling processes become complicated. Such electrolyte cannot avoid the presence of sodium, once the concentration of the sodium in the silicate electrolyte exceeds 0.1%, the viscosity of the electrolyte is increased significantly and becomes mushy. The electrolyte tends to lost water during application and leads to harden and crack. It decreases the performance of the batteries obviously and leads to poor self-discharge and high internal resistance and short cycle life.

SUMMARY OF THE INVENTION

The object of the invention is to overcome the disadvantages of conventional lead-acid storage batteries of using sulfuric acid electrolyte, such as environment pollution and healthy hazard, and to solve the problems of the gel-type electrolyte proposed by this inventor, such as the difficult filling, the complicated technology, and especially the hardness and crack of the electrolyte; furthermore, it overcomes the disadvantages of gel electrolyte, such as low fluidity and high internal resistance. The present invention provides a low concentration sodium-containing silicate electrolyte prepared by a magnetization method, the batteries using such an electrolyte have comparable specific energy density to conventional sulfuric acid lead-acid storage batteries; the specific energy density is 40~53 Wh/kg, it has a long cycle life and a wide operating temperature range.

The present invention can be realized as the followings: a low concentration sodium-containing silicate electrolyte is prepared by a magnetization method, such a low concentration sodium-containing silicate electrolyte is prepared by the following steps:

1. Take a silica gel containing 40~60 wt % $SiO_2$, the weight units of such a sol are 5~15;

2. Add water into the silica gel and stir the mixture at the same time, the weight units of water are 15~25. Use a Baum densimeter to measure the concentration, add water until the concentration is 0.65~0.85 .sup.0Be'; the water mentioned here is distilled water or deionized water.

3. Add inorganic acid into the above mixture until pH value is 1-4. Inorganic acid mentioned here is hydrochloric acid, oxalic acid and sulfuric acid;

4. Put the mixture obtained in Step 3 into a magnetic field of 1000-6000 Gauss for 5-10 minutes magnetization; the magnetic field as described here is performed through a round tube made from a magnetic material or is an ac/dc magnetic field;

5. Stir the magnetized mixture obtained in Step 4, the type of stirring includes manual stirring or mechanical stirring. The speed for mechanical stirring is 700-1400 r/m. Stirring lasts 5-10 minutes until the viscosity of the above mixture is decreased to 0.02 poise.

After these steps are carried out, a liquid low concentration sodium-containing silicate electrolyte for lead-acid storage batteries is obtained.

The purity of the reagents used above is at least chemical pure, usually use reagent grade. The magnetic material used for making the round tube having 1000-6000 Gauss includes NdFeB, ferrite and other magnetic materials.

The electrolyte provided in the present invention can be used for common lead-acid storage batteries or specific lead-acid storage batteries, such as deep-sea lead-acid storage batteries.

ADVANTAGES OF THE PRESENT INVENTION

1. Besides the composition of the electrolyte being changed, especially, due to the treatment by magnetization technology, the viscosity of the electrolyte is less than 0.02 poise. It becomes a liquid electrolyte and has good fluidity, and overcomes the disadvantages of the present silicate gel electrolyte, i.e. the high viscosity and the difficult filling processes, and especially the hardness and crack of the electrolyte during applications.

2. The specific energy density of the batteries using the liquid low concentration sodium-containing silicate electrolyte increases from 30~40 Wh/kg to 40~53 Wh/kg.

3. The internal resistance of the batteries using the liquid low concentration sodium-containing silicate electrolyte is very low and the cycle life is increased from normal 350 times to 400~1000 times and even more.

4. The batteries used the liquid low concentration sodium-containing silicate electrolyte can be operated at wide temperature range from −50° C.~+60° C.

5. Due to improved rate performance of the liquid low concentration sodium-containing silicate electrolyte, it increased significantly from common 3-7 C to 25-30 C.

6. Due to the application of the liquid low concentration sodium-containing silicate solution described in the present invention, no acidic smog is released during preparation and application, the environment pollution is avoided completely from using sulfuric acid, the hazard to the worker's healthy is prevented and the corrosion problems of sulfuric acid to the filling mouth and the leakage of the batteries outside shell are solved. All these have positive meaning to the society and improved economic profit.

7. The lead-acid storage batteries using the liquid low concentration sodium-containing silicate electrolyte have negligible self-discharge, it is good for long-time storage, the storage period is increased from normal 8 months to 18 months.

8. The battery standard is 100.

9. The electrolyte provided in the present invention can be used as electrolyte or activation solution for common lead-acid storage batteries or as electrolyte or activation solution for specific lead-acid storage batteries, such as deep-sea lead-acid storage batteries.

DESCRIPTION OF THE PREFERRED EMBODIMENTS

EXAMPLE 1

Prepare the liquid low concentration sodium-containing silicate solution as electrolyte for a 12V100 Ah3 C (300 A) lead-acid storage battery.

(1). Take 1.5 kg silica gel (commercial product No.: S-40 at reagent purity) containing 40~60 wt % $SiO_2$, it corresponds a 5 units weight;

(2). Drop distilled water or deionized water into the above silica gel and stir the mixture at the same time, until the value read in Baum densimeter is 0.65 °Be'; totally the volume of the water is about 4 liters;

(3). Add 98.3%, density 1.834 sulfuric acid into the solution mentioned above until PH value is 1.32, the volume of sulfuric acid is about 2 liter;

(4). Put the silicate mixture obtained in the above steps into the center position of a magnetic field of 3000-4000 Gauss for 8 minutes magnetization to obtain a magnetized mixture, the magnetic field is performed by a 800 mm diameter ×600 mm high round tube made from NdFeB;

(5). Stir the magnetized mixture obtained in the above step mechanically at a speed of 700~1400 r/m for about 10 minutes until the viscosity of the above mixture is less than 0.02 poise.

Finally, a liquid low concentration sodium-containing silicate solution as electrolyte for a 12V 100 Ah lead-acid storage battery is prepared.

Figure 1:
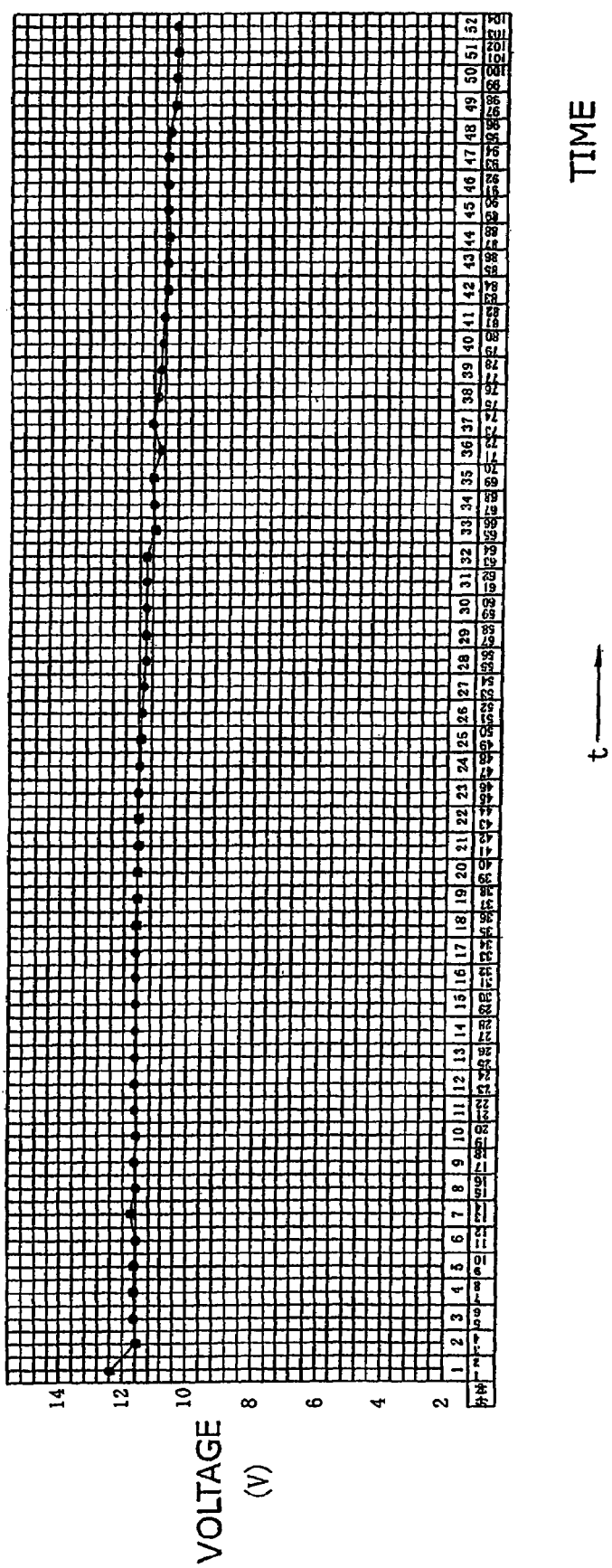
FIG. 1 is a voltage diagram of the discharge curve of a lead-acid storage battery using the liquid low concentration sodium-containing silicate solution as electrolyte.
Figure 2:
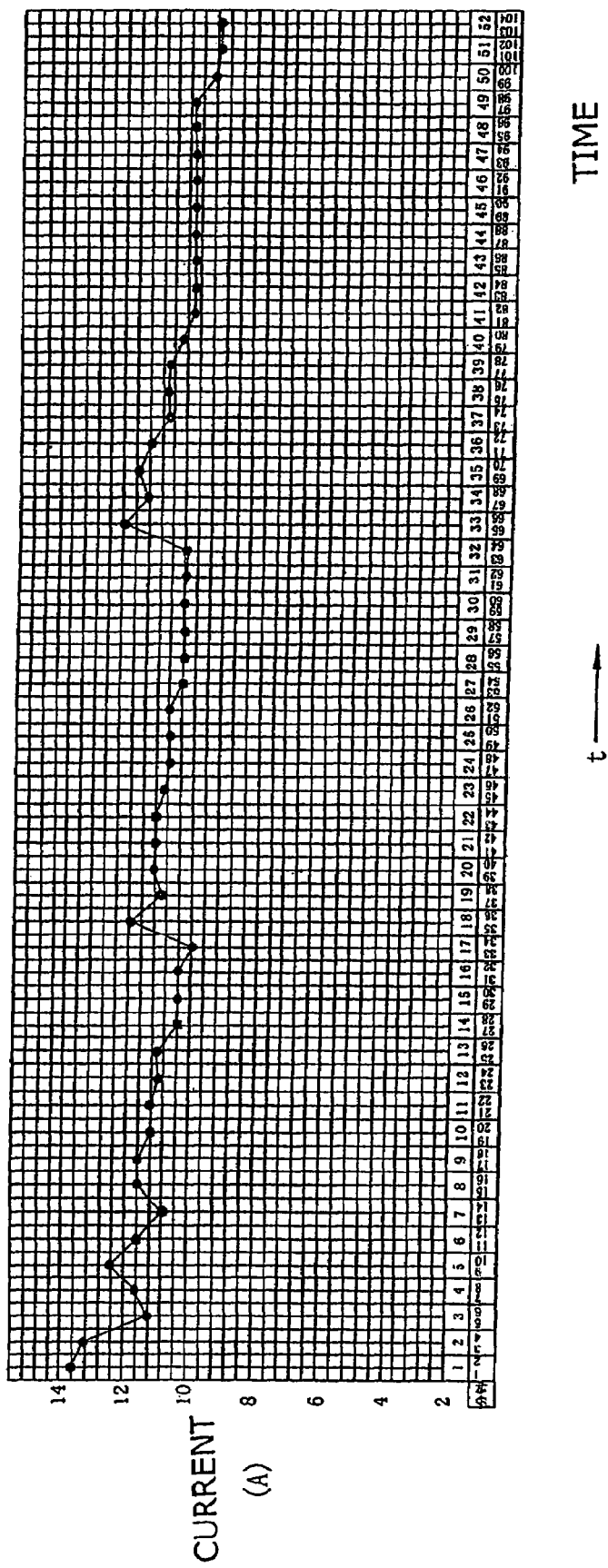
FIG. 2 is a current diagram of the discharge curve a lead-acid storage battery using the liquid low concentration sodium-containing silicate solution as electrolyte.

Using the electrolyte prepared by the above procedures, the lead-acid storage battery showed a standard evaluated value of 100, the energy density is increased to 40~53 Wh/kg, the cycle life of the lead-acid storage batteries is increased to more than 400 times, it can be used properly at a wide temperature range of −50° C.~+60° C. and the rate performance is improved significantly from common 3-7 C to 30 C. The self-discharge of the batteries can be negligible, and it can be used even after 18 months storage. The voltage diagram of the discharge curve of a lead-acid storage battery using the liquid low concentration sodium-containing silicate solution as electrolyte is shown in FIG. 1 and the current diagram of the discharge curve a lead-acid storage battery using the liquid low concentration sodium-containing silicate solution as electrolyte is shown in FIG. 2.

EXAMPLE 2

Prepare a liquid low concentration sodium-containing silicate solution as electrolyte for a 12V12 Ah lead-acid storage battery.

(1). Take 5 kg silica gel (commercial product No.: S-40 at reagent purity) containing 60 wt % $SiO_2$, (this corresponds to 5 units of weight); (2). Drop distilled water or deionized water into the above silica gel and stir the mixture at the same time, until the value read in Baum densimeter is 0.65 °Be'; totally the volume of the water is about 15 liters;

(3). Add 98.3%, density 1.834 sulfuric acid into the solution mentioned above until the PH value is 1.31, the volume of sulfuric acid is about 2 liter; (4). Put the silicate mixture obtained in the above steps into the center position of a magnetic field of 4000-5000 Gauss for 6 minutes magnetization to obtain a magnetized mixture, the magnetic field is performed by a 800 mm diameter ×800 mm high round tube made from NdFeB;

(5). Stir the magnetized mixture obtained in the above step mechanically at a speed of 700~1400 r/m for 6 minutes until the viscosity of the above mixture is less than 0.02 poise.

Finally, a liquid low concentration sodium-containing silicate solution as electrolyte for a 12V12 Ah lead-acid storage battery is prepared.

Using the electrolyte prepared by above procedures, the lead-acid storage battery showed a standard evaluated value of 100, the energy density is increased to 40~53 Wh/kg, the cycle life of the lead-acid storage batteries is increased to more than 1000 times, it can be used properly at a wide temperature range of −50° C.~+60° C. and the rate performance is improved significantly from common 3-7 C to more than 30 C. The self-discharge of the batteries can be negligible, and it can be used even after 18 months storage.

What is claimed is:

1. A method of making a magnetically treated low concentration sodium-containing silicate solution for a lead-acid storage battery, comprising:

1) preparing 5~15 weight units of a silica gel containing 40~60 wt % $SiO_2$;

2) adding 15~25 weight units of water to the silica gel and stirring the mixture at the same time, until the concentration is 0.65~0.85 °Be' measured using a Baume' densimeter;
3) adding inorganic acid to the solution of step 2) until a pH value is 1-4 to obtain a silicate mixture;
4) exposing the silicate mixture obtained in step 3) to a magnetic field of 1000-6000 Gauss for 5-10 minutes to obtain a magnetized mixture; and
5) stirring the magnetized mixture obtained in step 4) until the viscosity of the magnetized mixture is less than 0.02 poise.

2. A method as set forth in claim 1, wherein the water is deionized water or distilled water.

3. A method as set forth in claim 1, wherein the inorganic acid is one of hydrochloric acid, oxalic acid, sulfuric acid.

4. A method as set forth in claim 1, wherein the stirring speed is 700~1400 r/m, and wherein the stirring is continued for 5~10 minutes.

5. A method as set forth in claim 1, wherein the magnetic field is generated using a round tube of NdFeB with a 1000-6000 Gauss magnetic intensity.

\* \* \* \* \*